US012634007B2

(12) United States Patent
Kirschenmann et al.

(10) Patent No.: US 12,634,007 B2
(45) Date of Patent: May 19, 2026

(54) OPTICAL NETWORK TEST INSTRUMENT INCLUDING TESTING FOR OPTICAL NETWORK UNIT AND OPTICAL LINE TERMINAL ASSIGNMENT

(71) Applicant: VIAVI SOLUTIONS INC., Chandler, AZ (US)

(72) Inventors: Niki Kirschenmann, Unterhausen (DE); Joachim Lönne, Pliezhausen (DE); Dominik Prause, Reutlingen (DE); Olivier Daire, Montigny-le-bretonneux (FR)

(73) Assignee: VIAVI SOLUTIONS INC., Chandler, AZ (US)

( * ) Notice: Subject to any disclaimer, the term of this patent is extended or adjusted under 35 U.S.C. 154(b) by 275 days.

(21) Appl. No.: 18/366,519

(22) Filed: Aug. 7, 2023

(65) Prior Publication Data

US 2024/0171273 A1     May 23, 2024

(30) Foreign Application Priority Data

Nov. 18, 2022     (EP) ..................................... 22306700

(51) Int. Cl.
*H04B 10/079* (2013.01)
*H04Q 11/04* (2006.01)
*H04Q 11/00* (2006.01)

(52) U.S. Cl.
CPC ..... *H04B 10/07955* (2013.01); *H04Q 11/045* (2013.01); *H04Q 2011/0083* (2013.01)

(58) Field of Classification Search
CPC ........... H04B 10/07955; H04Q 11/045; H04Q 2011/0083
See application file for complete search history.

(56) References Cited

U.S. PATENT DOCUMENTS

| | | | | |
|---|---|---|---|---|
| 7,561,798 B2 * | 7/2009 | Kokkinos | .............. | H04B 10/00 398/31 |
| 9,219,567 B2 * | 12/2015 | Kim | .................. | H04Q 11/0005 |
| 9,847,832 B2 * | 12/2017 | Prause | ............... | H04B 10/2589 |
| 2017/0005723 A1 * | 1/2017 | Prause | .................. | H04B 10/07 |

FOREIGN PATENT DOCUMENTS

| | | | |
|---|---|---|---|
| EP | 2846479 A1 | 3/2015 | |
| EP | 3112838 A1 | 1/2017 | |
| KR | 2023061073 A | * 5/2023 | |

OTHER PUBLICATIONS

EPO, "The extended search report for Application No. EP22306700.0-1506", dated Aug. 9, 2023, 14 pages.
EPO, "The Partial European search report for application No. EP22306700.0-1206", dated May 9, 2023, 17 pages.

* cited by examiner

*Primary Examiner* — Kenneth N Vanderpuye
*Assistant Examiner* — Asif Shameem
(74) *Attorney, Agent, or Firm* — Mannava & Kang, P.C.

(57) ABSTRACT

A test instrument can be coupled to a test point in a passive optical network (PON) to perform an optical network unit (ONU) assignment determination test. The ONU assignment determination test determines a one-to-one assignment of an ONU to an optical line terminal (OLT) in the PON from a downstream signal received during an activation process. The test instrument can capture downstream signals for OLTs of different PONs simultaneously operating on the same optical distribution network to determine ONU assignment for the different PONs in a single test. The test instrument can be a termination mode device.

20 Claims, 8 Drawing Sheets

600

600

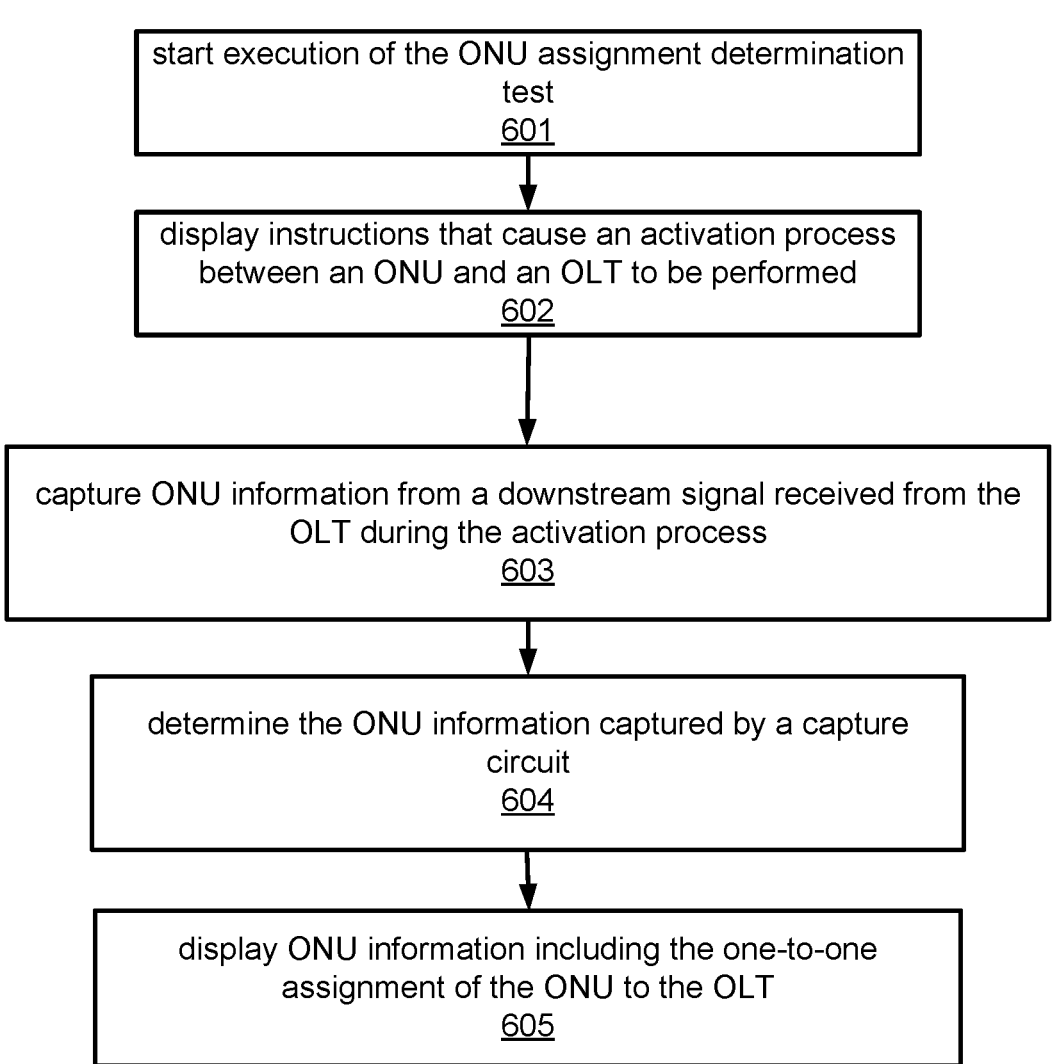

start execution of the ONU assignment determination
test
601 display instructions that cause an activation process
between an ONU and an OLT to be performed
602 capture ONU information from a downstream signal received from the
OLT during the activation process
603 determine the ONU information captured by a capture
circuit
604 display ONU information including the one-to-one
assignment of the ONU to the OLT
605

FIG. 6

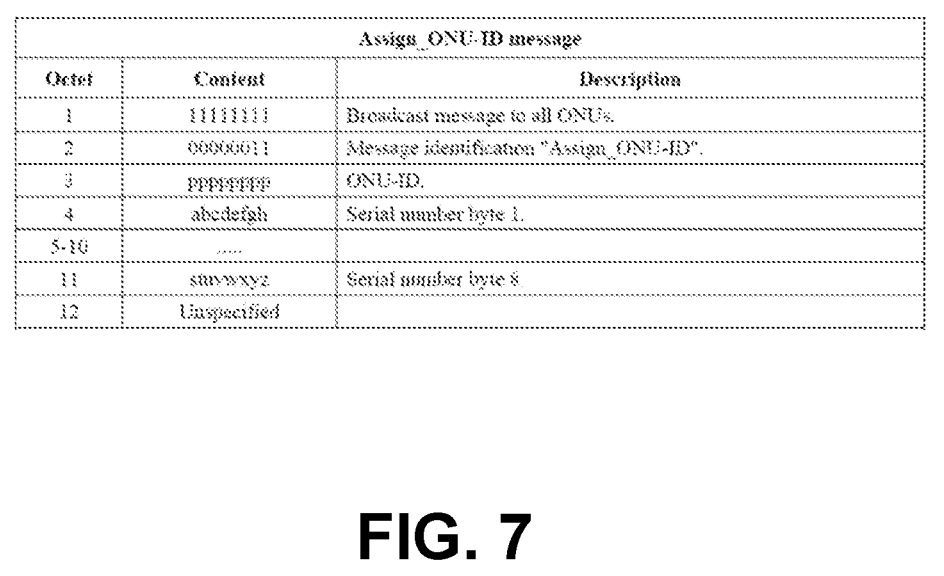

| Assign_ONU-ID message | | |
|---|---|---|
| Octet | Content | Description |
| 1 | 11111111 | Broadcast message to all ONUs. |
| 2 | 00000011 | Message identification "Assign_ONU-ID". |
| 3 | pppppppp | ONU-ID. |
| 4 | abcdefgh | Serial number byte 1. |
| 5-10 | ..... | |
| 11 | smvwxyz | Serial number byte 8 |
| 12 | Unspecified | |

FIG. 7

OPTICAL NETWORK TEST INSTRUMENT INCLUDING TESTING FOR OPTICAL NETWORK UNIT AND OPTICAL LINE TERMINAL ASSIGNMENT

PRIORITY

This present application claims priority under 35 U.S.C. 119 (a)-(d) to European patent application number 22306700.0, having a filing date of Nov. 18, 2022, the disclosure of which is hereby incorporated by reference in its entirety.

BACKGROUND

Optical networks encode signals to light to transmit information to its destination via fiber optic cables. Optical networks have become extremely popular because of their high bandwidth capabilities, and are often used by service providers for delivering services, such as cable television, high-speed Internet, telephone, etc., to customers. Traditionally, fiber optic networks were used in a portion of the network, and other communication mediums were used to connect the customer premises to the network. Recently, network service providers have been installing fiber optic cables all the way to the customer premises, allowing for better quality of service.

One type of optical network is a passive optical network. A passive optical network uses optical splitters and couplers to separate signals and deliver the signals to their proper destinations. Commonly, a passive optical network includes a central optical line terminal (OLT) that is connected with a plurality of optical network units (ONUs) via an optical distribution network (ODN) including optical fibers connected by optical splitters and couplers. A single OLT may communicate with multiple ONUs in a point-to-multipoint configuration. The OLT may broadcast downstream signals to the ONUs, and organize upstream communication from the ONUs to the OLT using time-domain multiple access (TDMA).

Technicians servicing passive optical networks may travel to various locations of the ODN, such as when installing new ONUs, or when trouble shooting service degradation or outages experienced by the customer, or when changing a customer to a new service provider. This may entail running tests at various test points in the ODN between an OLT and an ONU.

BRIEF DESCRIPTION OF DRAWINGS

Features of the present disclosure are illustrated by way of examples shown in the following figures. In the following figures, like numerals indicate like elements, in which:

FIG. 6 illustrates a method of capturing ONU information with a test instrument, according to an example of the present disclosure; and FIG. 7 illustrates bytes of an Assign_ONU-ID message.

DETAILED DESCRIPTION

Figure 1:
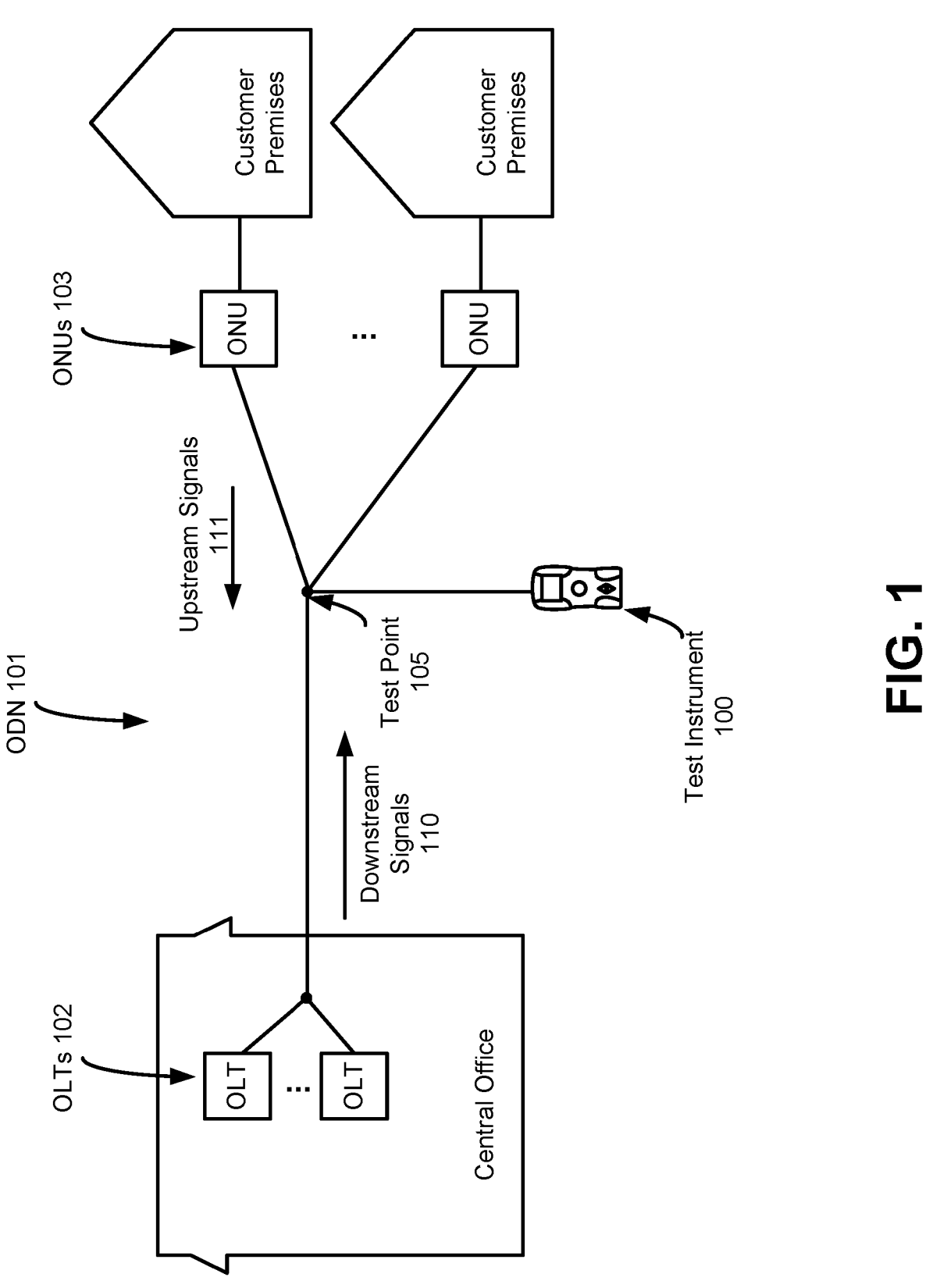
FIG. 1 illustrates an optical network with a test instrument connected at a test point, according to an example of the present disclosure.

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

A test instrument for optical networks may be connected to the optical network to measure parameters of optical signals transmitted in the optical network. The test instrument may also capture parameters of devices connected to the optical network, including device identifiers, from optical signals received by the test instrument. The optical signals include downstream signals transmitted from a service provider end point towards customer premises in the optical network. A test instrument is an apparatus that can connect to an optical network and can determine information about devices connected to the optical network and/or information about optical signals transmitted in the optical network.

In an example, the test instrument may be connected to a passive optical network (PON). For example, the test instrument may be connected to a test point in an optical distribution network (ODN) of the PON. The test point may be between an optical line terminal (OLT) and one or more optical network units (ONUs). The OLT may be a service provider endpoint in the PON that sends downstream optical signals to the ONUs which may be connected to customer premises. The test instrument can take measurements of the downstream optical signals. The test instrument can run a test to determine ONU information from downstream signals which can be used for trouble shooting and verifying customers are connected to the desired OLT. The test instrument can also take power level measurements. Both average optical power levels and peak optical power levels may be measured and recorded and compared against thresholds to determine whether the power levels of the optical signals are within acceptable tolerances.

The test instrument may include a processor, display, and data storage to store and display measurements and ONU information determined from bytes captured from the downstream signals. The test instrument may include a network interface, such as WiFi, Bluetooth, Ethernet, etc., to connect the test instrument to other devices via a network, and to transmit the stored data to other devices or computers and/or receive information which may be used for running tests. In one example, the test instrument is a portable, hand-held device. In other examples, the test instrument may be part of a larger system.

The test instrument may include a capture circuit to capture the ONU information from downstream signals. In an example, to run an ONU assignment determination test, the test instrument generates and displays instructions to prompt disconnecting and reconnecting an ONT to invoke an activation process while the test instrument is connected to a test point in the ODU between an OLT and an ONU. The activation process refers to a set of distributed procedures set forth in a standard allowing an inactive ONU to join or resume operations on the PON. For example, the ONU information is captured from a downstream signal during a serial number acquisition phase of the activation process.

The ONU information determined from captured downstream signals transmitted from an OLT to an ONU includes an ONU serial number and a corresponding OLT ID. The ONU serial number may be a unique identifier assigned by a manufacturer or another entity and typically does not change. The OLT ID uniquely identifies the OLT. For example, the ODN may have multiple OLTs simultaneously operating different types of GPONs on the ODN, and each OLT has a unique OLT ID. The ONU serial number and the corresponding OLT ID determined from captured downstream signals provides a one-to-one assignment of ONU serial number to OLT ID, which can be used for debugging as is further discussed below. Other ONU information determined from the downstream signal includes an ONU ID assigned by the OLT and a PON type.

In an example, use case, the test instrument can be used to verify a connection between a particular OLT and a particular ONU in a PON. For example, assume a customer is changing service providers. Accordingly, the ONU at the customer premises needs to be connected to a different OLT corresponding to the new service provider. A technician may be dispatched to a splitter cabinet located at a last mile between the OLT and the ONU to connect the customer to the OLT of the new service provider. In many instances, there can be a "spaghetti" of hundreds of optical fibers in the splitter cabinet. It can be very difficult for the technician to determine which optical connection corresponds to the customer and the correct OLT. The test instrument can run the ONU assignment determination test on an optical connection between an OLT and an ONU to determine the one-to-one assignment of the ONU serial number and the OLT ID. Based on this information, the technician can determine which optical connection in the splitter cabinet corresponds to the ONU of the customer, and can connect to the new OLT and verify through the test that the customer is connected to the correct OLT. In other words, the one-to-one assignment of OLT-ID and ONU serial number determined by the test allows a technician to determine with certainty which customer is connected to which OLT.

According to an example of the present disclosure, the test instrument is a termination mode device with a single optical connection, e.g., optical port, to connect to a test point in the ODU to run the ONU assignment determination test to determine the one-to-one assignment of the ONU serial number and the OLT ID and to determine other ONU information. This makes it easier for the technician to correctly connect the test instrument to the proper optical fiber or optical connector at the test point for testing the desired connection to a particular customer premises. A termination mode device is an endpoint for signals received from the PON. Thus, optical signals from the PON that are received by the termination mode device terminate at the termination mode device. This is opposed to a through mode device which receives an optical signal from the PON, for example, via a first optical port connected to the PON, and passes the optical signal or an optical signal derived from the received optical signal via a second optical port connected to the PON towards its destination, which could be upstream or downstream. Accordingly, the test instrument implemented as a termination mode device can have a single optical port for connection to a test point in the PON to run the ONU assignment determination test, rather than having two separate optical connections if it were a through mode device, which would require the technician to connect both optical ports to the proper optical connections at the test point to run the test.

The test instrument may be used with any suitable type of optical network, including different types of Gigabit PONs, such as GPON, 10 Gigabit symmetrical PON (XGS-PON), next generation—passive optical network (NG-PON2), etc. As discussed above, the test instrument can run the ONU assignment determination test to invoke an active process to determine the one-to-one assignment of the ONU serial number and the OLT ID. The activation process is set forth by a standard. Protocol messages exchanged during an ONU activation process for GPON are described in the ITU-T G.984 communications standard. ITU-T G.987 is the standard for 10G-PON. ITU-T G.989 is the standard for NG-PON2. The test instrument may be used for these and other types of PONs employing other standards, including but not limited to Ethernet Passive Optical Network (EPON) (IEEE 802.3ah) and 10G EPON (IEEE 802.3.av).

According to an example, the test instrument can detect ONU information for different types of PONs that simultaneously use the same ODU. For example, optical signals transmitted over optical fibers may have different classifications in terms of attributes such as length, loss, speed, etc. For example, Gigabit-capable passive optical network (GPON), 10 Gigabit symmetrical PON (X GS-PON), next generation—passive optical network (NG-PON2), etc., may represent different classifications with respect to speed. Each of these types of PONs utilizes a specific wavelength (or color) in the optical domain. For example, a GPON system uses 1490 nm downstream, and 1310 nm upstream, and include speeds up to 2.5 GBps; an XGS-PON uses 1577 nm downstream, and 1270 nm upstream, and include speeds up to 10 GBps; and an NG-PON2 uses 1596-1603 nm downstream, and 1528-1540 nm upstream, with speeds up to 80 GBps. EPON wavelengths are 1490 nm downstream and 1310 nm upstream, leaving the 1550 nm wavelength for a cable television (CATV) overlay, with speeds up to 1.25 GBps. 10G EPON provides speeds up to 10 GBps. The 802.3av standard places significant emphasis on enabling simultaneous operation of 1 GBps and 10 GBps EPON systems on the same outside plant. In the downstream direction, the 1 GBps and 10 GBps channels are separated in the wavelength domain, with 1 GBps transmission limited to 1480-1500 nm band and 10 GBps transmission using 1575-1580 nm band. In the upstream direction, the 1 GBps and 10 GBps bands overlap. 1 GBps band spreads from 1260 to 1360 nm, and the 10 GBps band uses 1260 to 1280 nm. The test instrument can simultaneously detect ONU information for these and other types of PONs. For example, assume a GPON and an XGS-PON operate simultaneously on the same ODU PON infrastructure. The test instrument can run a single ONU assignment determination test, and the test results will provide the ONU serial number and the corresponding OLT ID and the PON type for both PONs.

Another technical benefit of the test instrument is that it determines the ONU information from downstream signals, which are broadcasted from the OLT. Upstream optical signals may be sent from the ONUs to the OLT. However, capturing upstream signals sent from ONUs to the OLT is technically very challenging due to the bursty nature of the upstream signals. For example, the OLT broadcasts optical signals to the ONUs in continuous mode. However, for upstream signals, the ONUs typically transmit data in allocated time slots, e.g., an ONU may transmit an upstream signal in burst mode in an allocated time slot. Due to variations in phase and amplitude, information in the burst mode upstream signals can be difficult to capture. Examples described capture information, including the ONU information, from downstream signals, which are broadcasted from the OLT.

FIG. 1 illustrates a test instrument 100 connected to an ODN 101 that may provide the infrastructure for multiple different types of PONs operating simultaneously on the same ODN. The test instrument 100 may be connected between a service provider end point and a node in the network. For example, as shown in FIG. 1, the test instrument 100 is connected to test point 105 in the ODN 101 to run the ONU assignment determination test, power tests and other tests. The ODN 101 carries bidirectional traffic. The test point 105 is between OLTs 102, which may be located at a central office of a service provider, and ONUs 103, which may be located at or near multiple customer premises. OLTs 102 may include OLTs for different types of PONs, such as an OLT for a GPON, an OLT for an XGS-PON, an OLT for an NG-PON, an OLT for EPON, and an OLT for 10G EPON. Different ones of the ONUs 103 may be connected to different one of the OLTs 102 by splitters. For example, different OLTs may be provided for different broadband service providers, and the ONUs for different customers are connected to the corresponding OLTs for the corresponding service provider of the customer. FIG. 1 is a simplified block diagram and one of ordinary skill in the art would recognize that the system shown may include other components including multiple splitters and combiners and couplers in the ODN 101. The terms optical network unit or ONU and optical network terminal or ONT are used interchangeably herein, because they perform similar operations according to the examples described herein.

To connect the test instrument 100 at the test point 105 shown in FIG. 1, an optical port of the test instrument 100 is connected to the test point 105. In examples, the optical port of the test instrument 100 may be connected to the test point 105 via an optical patch cord, and in some instances, an optical coupler may be used depending on the type of test point. Examples of the connecting the test instrument 100 to different test points in the ODN 101 are further described below.

Downstream signals 110 are shown as optical signals transmitted from the OLTs 102 to the ONUs 103, and upstream signals 111 are shown as optical signals transmitted from the ONUs 103 to the OLTs 102. The downstream signals 110 are broadcasted and may include data for broadband services, e.g., data for internet service, data for cable television, data for voice-over internet protocol, etc., or administrative messages, e.g., physical layer operation and maintenance (PLOAM) messages. The downstream signals 110 may include signals broadcasted from an OLT to multiple ONTs connected to the OLT. An upstream signal, which is an optical signal transmitted in the ODN 101, includes signals sent from ONUs to an OLT. Upstream signals are commonly organized using TDMA. For example, the upstream signals 111 may be sent in time slots assigned by an OLT 102. Different frequencies may be used to transmit downstream and upstream signals. Also, the downstream signals 110 and the upstream signals 111 may include signals for different types of PON that use different frequencies but are operating simultaneously on the ODN 101.

The test instrument 100 for example is a termination mode device that receives downstream optical signals via the test point and executes tests based on the received downstream optical signals. However, the received downstream optical signals are not passed through the test instrument 100 to a destination, such as one of the ONUs. The test instrument 100 may capture information from the downstream signals 110, including ONU information, and measure power and other parameters of the downstream signals 110.

The test instrument 100 may be deployed in an optical network that includes one or more PONs. A PON may use unpowered optical splitters to enable a single optical fiber to serve multiple customer premises. The ODN 101 may include a point-to-multipoint configuration that includes optical power splitters/combiners (OSCs). The test instrument 100 may connect at different test points in the ODN 101 as is discussed below. The ODN 101 may include more than one OLT and may include more ONUs than shown. The ODN 101 carries bidirectional optical traffic between the OLTs and the ONUs. Downstream signals may be broadcasted by the OLTs to the ONUs and may carry data intended for all the ONUs or individual ONUs. The downstream signals may be power divided by OSCs. The OLTs may be connected to another network, e.g., an Ethernet network, which serves as an external source and recipient of communications. The ONUs may be connected to customer premises equipment located at multiple customer premises and/or may be connected to other networks. For example, the ONUs may be connected to respective subscriber networks or subscriber devices, which may be a source of payload data transmitted from the subscriber/customer premises side. Upstream signals may be organized using TDMA. For example, the OLT operates as a "master", which assigns a time slot to each of the ONUs during which an upstream transmission may be performed. OSCs may combine all signals arriving at downstream facing ports into combined upstream signals, in which all the upstream signal bursts from ONUs arrive properly separated in their time slots.

Figure 2A:
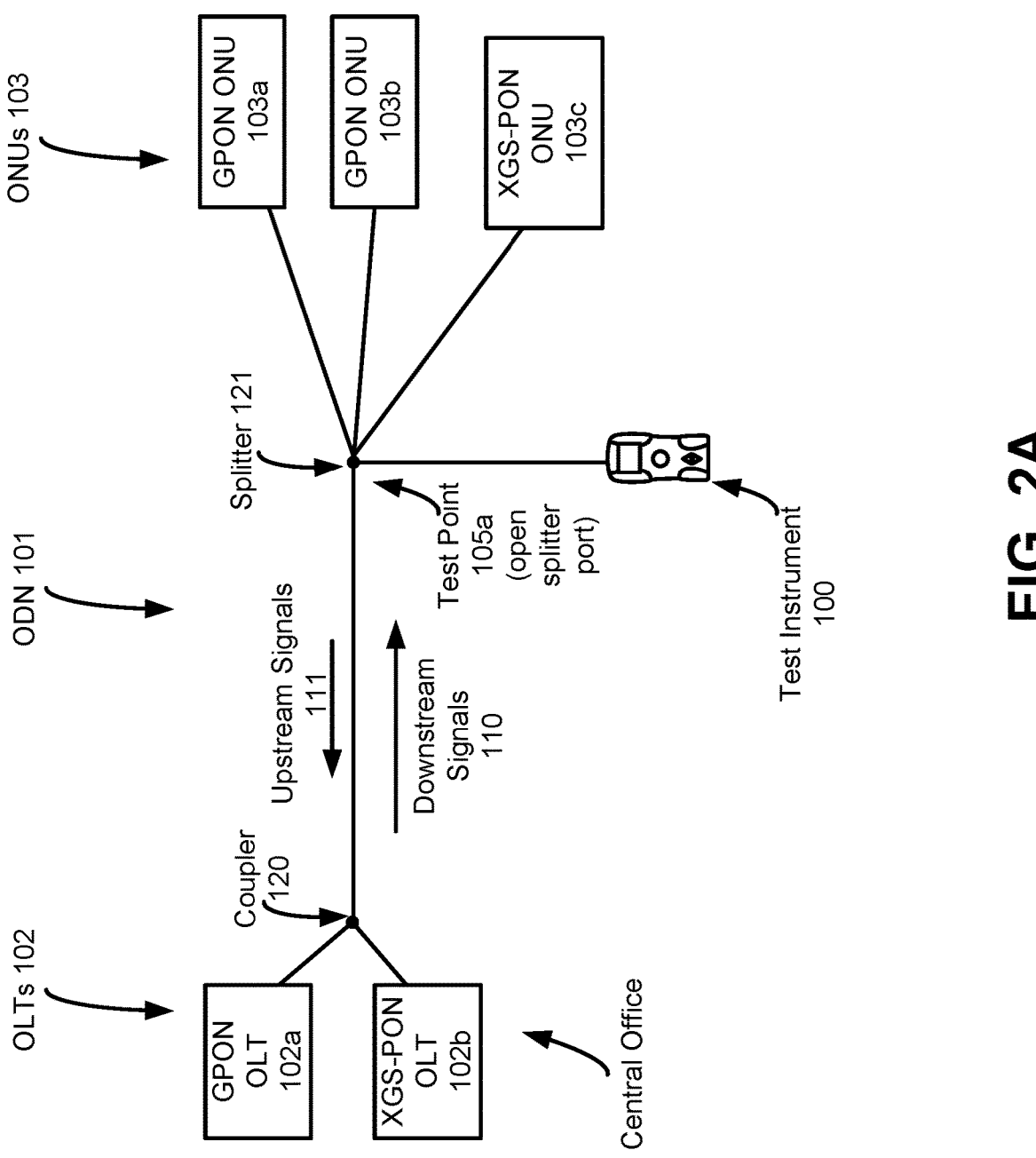
FIGS. 2A-B illustrate a test point in an optical distribution network, according to an example of the present disclosure.
Figure 2B:
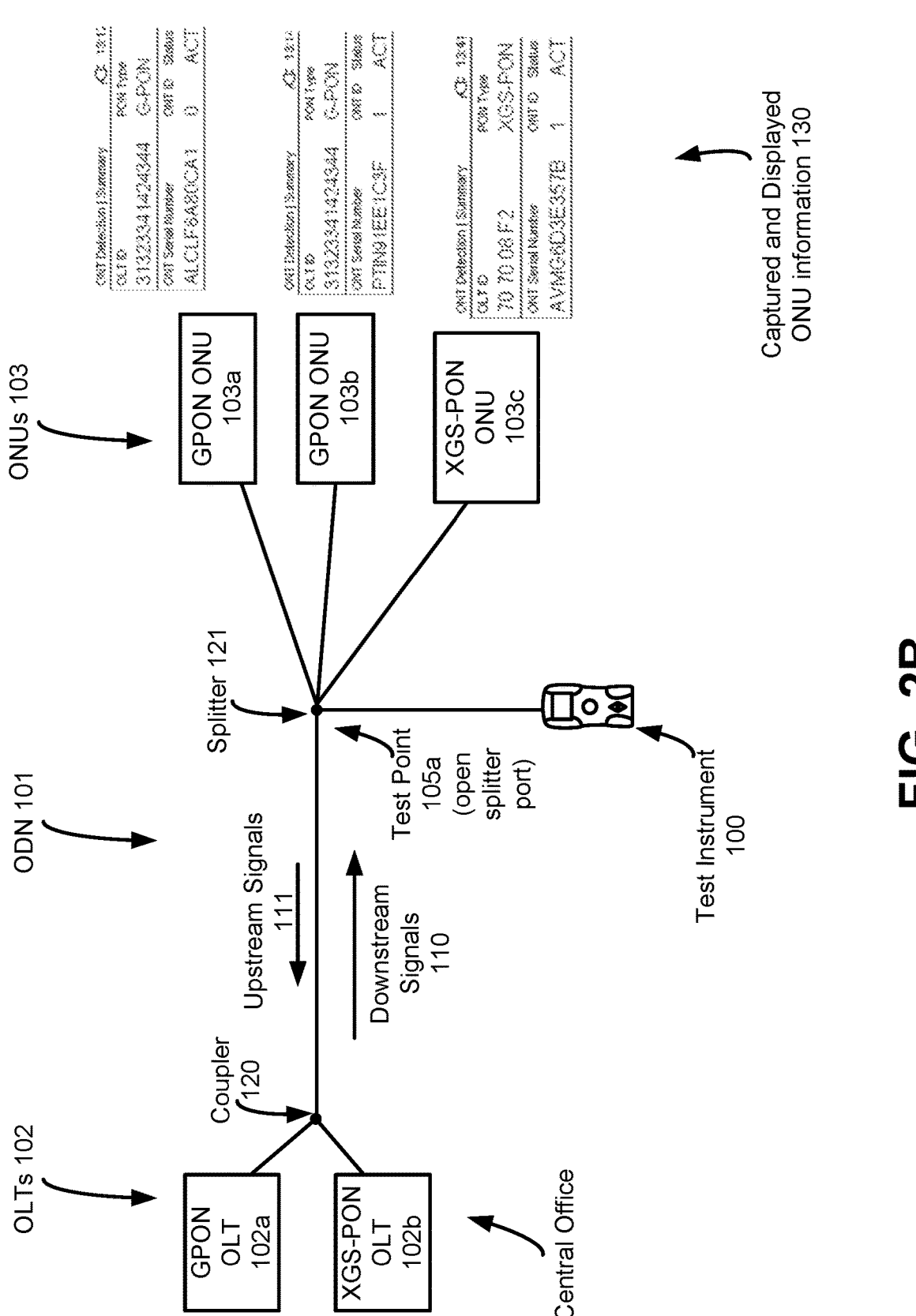

FIGS. 2A-B show an example where a GPON and an XGS-PON operate simultaneously on the ODN 101 in an overlay scenario. For example, the GPON includes a GPON OLT 102a communicating with GPON ONUs 103a-b via coupler 120 and splitter 121. The XGS-PON includes XGS-PON OLT 102b communicating with XGS-PON ONU 103c via coupler 120 and splitter 121.

Also, in this example, test point 105a is at an open port in splitter 121. For example, splitter 121 may be a 1:4 splitter, and the test instrument 100 is connected to an open port in the splitter 121 that is not connected to an ONU. The splitter 121 may be located at a splitter cabinet in a last mile of the ODN. The last mile refers to the final connection in the PON to the customer premises, such as the final connection to an ONU at the customer premises. For example, the last mile may include the connection in a downstream direction of the PON between the final splitter and the ODN. Technicians may be deployed to the splitter cabinet for installation and trouble-shooting instead of the customer premises to avoid bothering the customers.

In this example, the test instrument 100 is connected to the open splitter port, and the technician starts the ONU assignment determination test by selecting the test via a user interface of the test instrument 100. The test instrument 100 generates a display on the user interface that instructs the technician to disconnect and reconnect another ONU, such as one of ONUs 103a-c. This invokes an activation process while the test instrument 100 is connected to the test point 105a. For example, assume GPON ONU 103a is disconnected and reconnected to invoke the activation process. The activation process, for example, includes a serial number state. In this state, the GPON OLT 102a broadcasts a serial number request to all connected ONUs, e.g., GPON ONUs 103a-b. As a reply to the SN request, GPON ONU 103a enables the GPON OLT 102a to examine and detect the ONU serial number of GPON ONU 103a. In addition, the GPON OLT 102a broadcasts an Assign ONU-ID message downstream, which includes the ONU-ID and the ONU serial number. The test instrument 100 captures and displays this information. Examples of the captured and displayed information is shown in FIG. 2B, which is labeled captured and displayed ONU information 130. For example, the captured and displayed ONU information 130 includes the OLT ID, the ONU serial number, the PON type, and the ONU ID. The captured and displayed ONU information 130 may also include the ONU status, such as activated or deactivated. The captured and displayed ONU information 130 is displayed on a display of the test instrument 100.

The captured and displayed ONU information 130 includes the information for GPON ONU 103a if the GPON ONU 103a is disconnected and reconnected. The captured and displayed ONU information 130 includes the information for GPON ONU 103b if the GPON ONU 103b is disconnected and reconnected. The captured and displayed ONU information 130 includes the information for XGS-PON ONU 103c if the XGS-PON ONU 103c is disconnected and reconnected, which is broadcasted from XGS-PON OLT 102b. The test instrument 100 can compare a received serial number with a known serial number of an ONU to verify that the disconnected and reconnected link is a link from an OLT to a desired customer and then perform tests as needed on the link, such as power tests.

Figure 3:
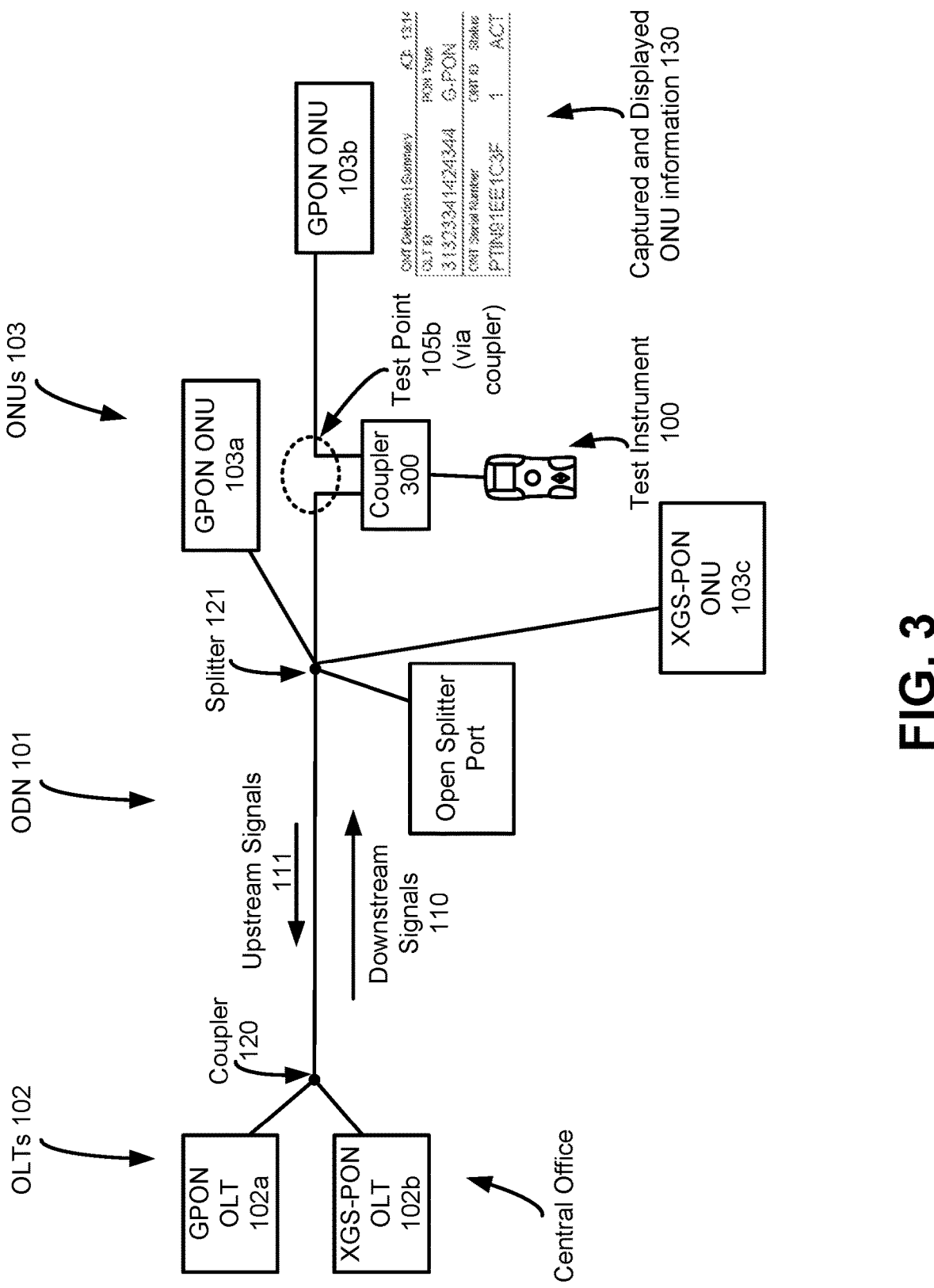
FIG. 3 illustrates a test point in an optical distribution network, according to another example of the present disclosure.

FIG. 3 shows another example of a test point where the test instrument 100 is connected to a link between the splitter 121 and an ONU via coupler 300. For example, test point 105b is between the splitter 121 and the GPON ONU 103b. In an example, coupler 300 may be a multiwavelength optical fiber coupler that allow bi-directional coupling and can be used to either split or combine signals, and can be used as a test access point. The coupler 300 may be a 1×2 coupler that can allow 60% of the light to pass to the test instrument and 40% of the light to pass to its destination in the ODN 101, which may be GPON ONU 103b for downstream signals. In this example, the technician starts the ONU assignment determination test by selecting the test via a user interface of the test instrument 100. The test instrument 100 is connected at test point 105b via coupler 300, which effectively disconnects and reconnects GPON ONU 103b to the GPON and invokes the activation process. The test instrument 100 may display instructions to prompt the technician to connect the test instrument 100 via the coupler 300. After the activation process is invoked, the test instrument 100 receives ONU information in downstream signals from the GPON OLT 102a. The captured and displayed ONU information 130 includes the information for GPON ONU 103b.

Figure 4:
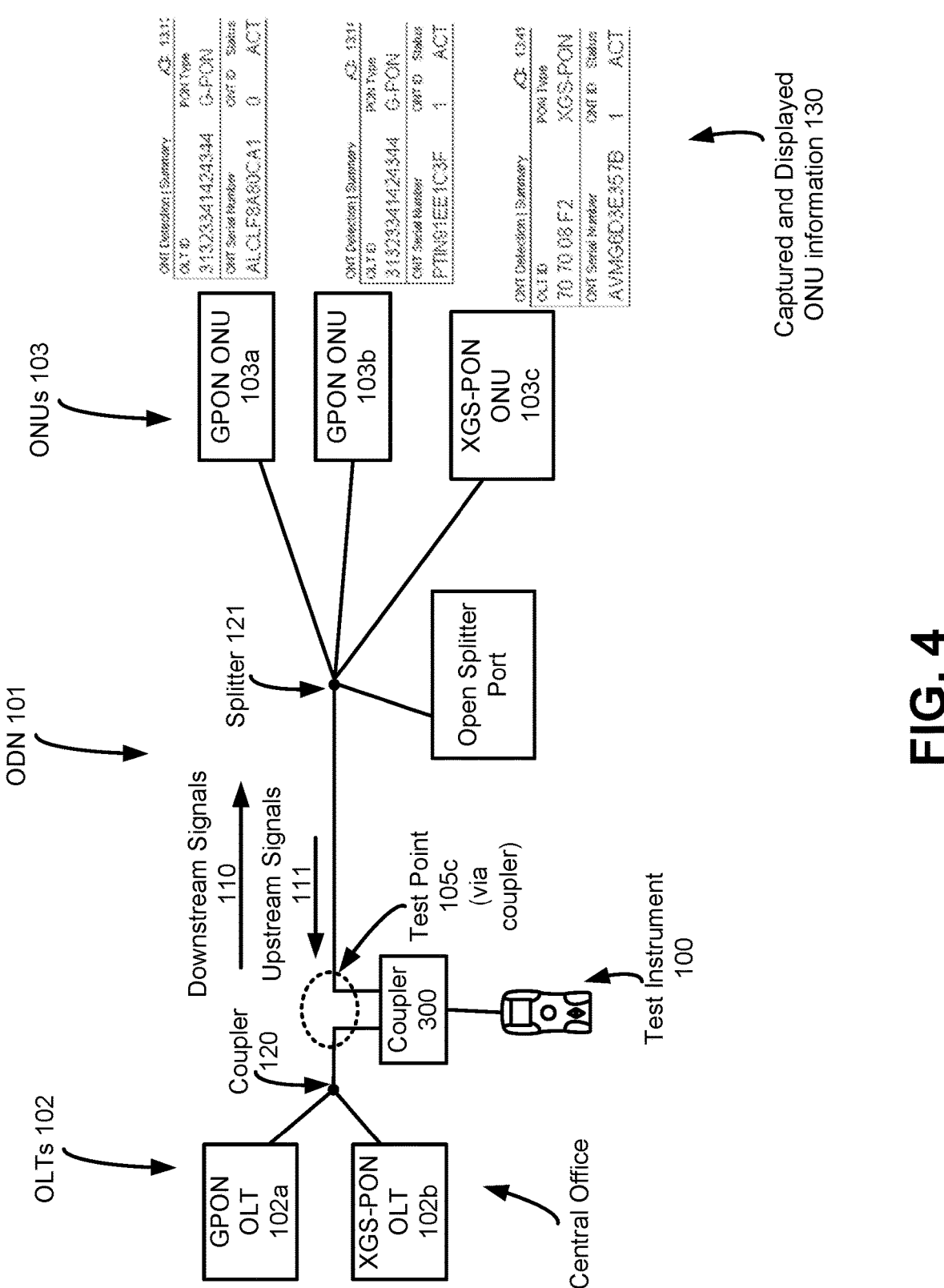
FIG. 4 illustrates a test point in an optical distribution network, according to yet another example of the present disclosure.

FIG. 4 shows yet another example of a test point where the test instrument 100 is connected to a link in the ODN 101 between an OLT and an ONU. In this example, test point 105c is between the coupler 120 and the splitter 121. In this example, the coupler 300 is used to connect the test instrument 100 to the test point 105c, like the example shown in FIG. 3. In FIG. 4, the test point 105c is upstream from the splitter 121. Accordingly, when the link is connected and disconnected due to the connection of the coupler at the test point 105c, all the downstream ONUs, e.g., GPON ONUs 103a-b and XGS-PON ONU 103c, are connected and disconnected. The activation process is invoked on both the GPON and the XGS-PON. After the activation process is invoked, the test instrument 100 receives ONU information in downstream signals from the GPON OLT 102a and the XGS-PON OLT 102b. The captured and displayed ONU information 130 includes ONU information for GPON ONUs 103a-b and XGS-PON ONU 103c. Connecting the test instrument 100 at test point 105c can be more disruptive to customers then connecting the test instrument 100 at test point 105a or 105b, because all the downstream ONUs get disconnected and reconnected which temporarily stops and starts services for all the customers connected to the downstream ONUs.

Figure 5:
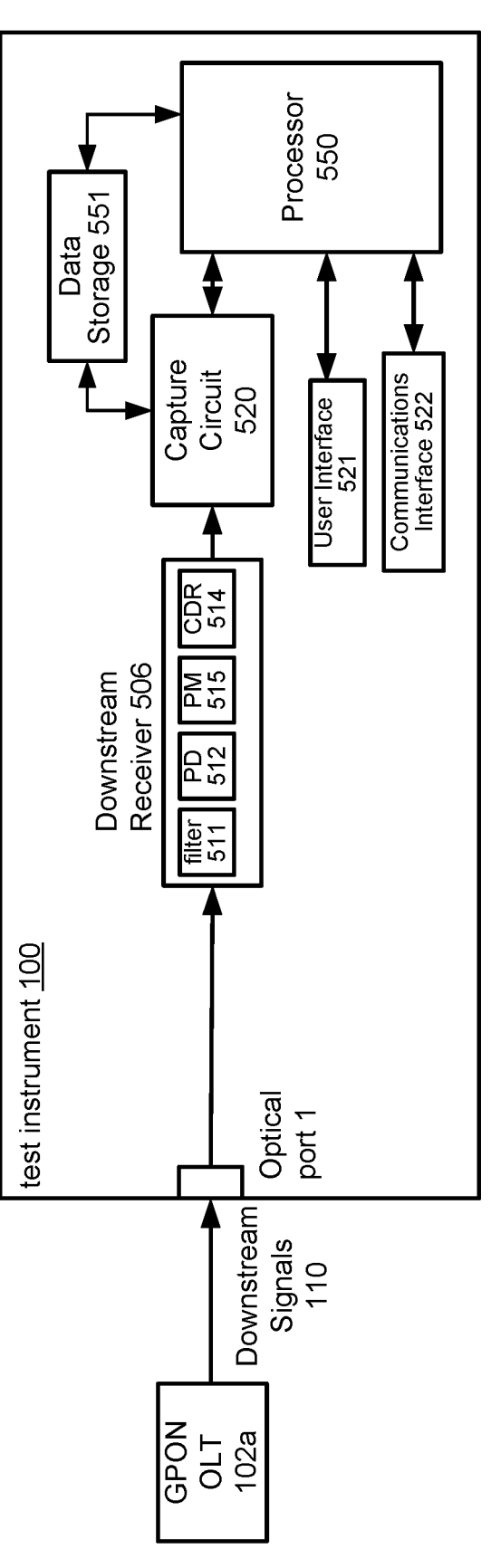
FIG. 5 illustrates a test instrument, according to an example of the present disclosure.

FIG. 5 shows the test instrument 100 according to an example. The test instrument 100 includes optical port 1 connected to fiber optic cables in an ODN. For example, assume the test instrument 100 is connected to the test point 105a shown in FIG. 2, which may include an open port in splitter 121. Also, assume GPON ONU 103b is connected and disconnected, and the test instrument 100 receives, via the optical port 1, downstream signals 110 from GPON OLT 102a during the activation process to determine ONU information for GPON ONU 103b. As discussed above, according to an example, the test instrument 100 is a termination mode device. Optical port 1 can receive upstream or downstream signals transmitted between GPON OLT 102a and GPON ONU 103b. For purposes of describing this example, downstream signals 110 are shown as being captured by the test instrument 100. Furthermore, it will be apparent to one of ordinary skill in the art that the test instrument 100 may have more than one optical port.

The downstream receiver 506 may include a filter 511 to pass desired wavelengths, a photodetector 512 to convert the received downstream optical signals 110 to electric signals, a power meter 515 to measure power levels and loss, a clock data recovery (CDR) circuit 514 to recover clock data from the electrical signal fed to the capture circuit 520, and other components to perform other functions.

The power meter 515 may measure peak and/or an average optical power, and may include amplifiers connected to a peak/average signal detector. Many types of amplifiers may be used. The test instrument 100 may include a user interface 521 to receive user input and to display information, such as power levels, loss, ONU information discussed herein, etc. For example, optical power level of the downstream traffic may be displayed together with the ONU information of the GPON ONU 103b. The user interface 521 may include a display, which may include a touch screen display, a keyboard, or other type of known user interface.

The decoupling and recoupling of GPON ONU 103b initiates the activation process between GPON OLT 102a and GPON ONU 103b. The activation process may correspond to a communication standard used by a particular PON. During the activation process, GPON ONU 103b may transmit its ONU serial number to GPON OLT 102a for example to announce its presence, and GPON OLT 102a may respond by transmitting a message that includes the ONU identifier, the ONU serial number, the OLT ID and the ONU ID and other information downstream. The test instrument 100 captures the ONU information in the message transmitted in the downstream signal. For example, the output of the downstream receiver 506 may include a digital data stream (e.g., bit stream) of bytes in the downstream signals 110. The capture circuit 520 captures the bytes of the downstream signals 110 during the activation process. The captured bytes include the ONU identifier, the ONU serial number, the OLT ID and the ONU ID. The capture circuit 520 extracts this information, thereby identifying the link that was disconnected as the link between GPON OLT 102*a* and GPON ONU 103*b*, and stores this information in the data storage 551. The data storage 551 may store any information captured from the downstream signals 110. The data storage 551 may store power level measurements or any other measurements taken by the test instrument 100. The stored information may be displayed and/or communicated via communications interface 522, such as WiFi, Ethernet, Bluetooth, USB, etc., to another device or system.

The capture circuit 520 starts and stops saving the bytes of the downstream signals 110 to the data storage 551. The conditions of when to start and stop saving the bytes may be derived from data patterns found in the data stream, e.g., bytes identifying an ONU-ID message, and may also utilize other signals provided from processor 550.

The processor 550 controls the test process, including the execution of the ONU assignment determination test, and performs data processing on the captured data. The processor 550 may also display information via the user interface 521 and transmit/receive data via the communications interface 522. The hardware of the test instrument 100, including the processor 550, may include a hardware processor, microcontroller, a digital signal processor (DSP), an application specific integrated circuit (ASIC), a field programmable gate array (FPGA) or other programmable logic device, discrete gate or transistor logic, discrete hardware components, or any combination thereof designed to perform the functions and methods described herein. In an example, one or more of the functions and steps of the methods may be performed by the processor 550 or other hardware executing machine readable instructions stored in a non-transitory computer readable medium, such as the data storage 551, which may comprise RAM (random access memory), ROM (read only memory), EPROM (erasable, programmable ROM), EEPROM (electrically erasable, programmable ROM), hard drives, flash memory, or other types of storage devices, which may be volatile and/or nonvolatile.

Sometimes different PON systems (e.g., G-PON, XGS-PON, NG-PON2, EPON, 10G EPON, etc.) operate over the same ODN. This is commonly referred to as an overlay scenario. Different PON systems generally use different wavelengths for downstream and upstream signals and may have different data rates. The filter 511 in downstream receiver 506 may include multiple filters to capture wavelengths for the different PON systems. Thus, the downstream receiver 506 can capture downstream signals for OLTs of different PONs simultaneously. The test instrument 100 may include other components that are not shown but are known in the art.

FIG. 6 shows a method 600 that may be performed by the test instrument 100. Steps of the method 600 and other methods described herein may be performed in orders other than shown and described or at the same time.

As discussed above, the test instrument 100 can determine ONU information from downstream messages broadcasted from an OLT during an activation process of an ONU. An ONU may communicate with the OLT according to a communication standard which sets forth the message exchange between the OLT and ONU during the activation process. According to an example, the communication standard may include the ITU-T G.984.3 communication standard for a gigabit-capable passive optical network (G-PON): Transmission convergence layer specification. The message exchange between the OLT and OLU during the activation process according to the G.984.3 communication standard includes the exchange of physical layer operation and maintenance (PLOAM) messages.

FIG. 6 shows a method for determining ONU information, which may be performed by the test instrument 100. Also, the test instrument 100 can measure power levels and other signal parameters of received optical signals.

At 601, the test instrument 100 starts execution of the ONU assignment determination test, which can determine a one-to-one assignment of an ONU to an OLT in a PON. Starting execution of the ONU assignment determination test may include a user selecting the ONU assignment determination test via the user interface 521 to cause the test to be started. The test instrument 100 may be operable to run multiple different tests on a PON, and the user, e.g., a technician, may select the ONU assignment determination test via the user interface 521 from among the different tests that the test instrument 100 can perform.

At 602, the test instrument 100 displays instructions on a display of the user interface 521. The instructions include instructions that cause an activation process between an ONU and an OLT to be performed. For example, referring to FIGS. 2A-B, the instructions may instruct a user to disconnect and reconnect an ONU, such as GPON ONU 103*b*, after connecting the test instrument 100 to a test point, such as test point 105*a*. This causes the activation process to be performed between GPON OLT 102*a* and GPON ONU 103*b*. In another example, the instructions may instruct a user to connect the test instrument 100 to a test point via an optical coupler, such as described with respect to FIGS. 3 and 4. This causes an ONU to be disconnected and reconnected which invokes the activation process.

At 603, the test instrument 100 captures ONU information from a downstream signal received from an OLT during the activation process. The ONU information includes the OLT ID, the ONU serial number, and the ONU ID. The ONU information 130 may also include the ONU status, such as activated or deactivated. The PON type may be determined from the OLT ID. The ONU information may be captured during a serial number state of the activation process.

The capture circuit 520 may capture the ONU information from the downstream signals from the OLT. For example, during the activation process, the ONU sends its serial number to the OLT, such as in a Serial_Number_ONU message. The OLT receives the Serial_Number_ONU message and extracts the ONU serial number. Then, the OLT assigns an ONU-ID to the ONU and sends an Assign_ONU-ID message to the ONU, including the serial number of the ONU and the ONU-ID assigned by the OLT. Also, the OLT ID is captured and other ONU information is captured. For example, the OLT ID is captured from a downstream frame transmitted from the OLT. According to the GPON protocol, a downstream frame includes a PCBd (physical control block downstream). The PCBd includes the PLOAMd (physical layer operation, administration and maintenance downstream), and the PLOAMd includes the PON ID (passive optical network identification). The PON-ID includes the OLT ID (optical line termination identification).

Bytes of the Assign_ONU-ID message are shown in FIG. 7. Byte 2 includes a pattern of bits that indicates that the message is an Assign_ONU-ID message. Byte 3 includes the ONU-ID and bytes 4-11 include the serial number of the ONU 103. Captured ONU information and other information is stored in data storage 551.

At 604, the test instrument 100 determines the ONU information captured by the capture circuit 520. This may include the processor 550 retrieving the captured ONU information from the data storage 551.

At 605, the test instrument 100 displays ONU information determined from the captured information on a display of the user interface 521. The ONU information includes the one-to-one assignment of the ONU to the OLT. For example, the processor 550 displays the ONU information including the OLT ID, the ONU serial number, and the ONU ID. The displayed information may also include ONU status, such as activated or deactivated. The displayed information may also include the PON type. The test instrument 100 may determine the PON type from the PON ID. The PON ID indicates the ODN architecture and its class, as well as the source of the reported power.

In an example, the test instrument 100 may also compare at least one the ONU serial number and the OLT ID captured from downstream signals during the activation process to a known ONU serial number and OLT ID for a customer. The test instrument 100 can display an indication of whether a match has been found. For example, a service ticket may be generated for a customer to switch the customer to a new service provider connected to a different OLT. The serial number of an ONU at the customer premises is known and stored in the test instrument 100. The serial number of the customer premises ONU is compared to the ONU serial number determined from the ONU information captured during the test. If it is a match, the test instrument 100 displays an indication that a match is identified. Then, the technician knows that the link is the correct link of the customer and the technician can connect the ONU to the new OLT as needed.

During the activation process, the ONU 103 may go through various states. In an initial state, the ONU 103 is powered up, and in a standby state, the ONU 103 is waiting for the PON parameters from the OLT 102. In a serial number state, the ONU 103 makes itself known to the OLT 102 by sending its serial number to the OLT 102 and the ONU 103 receives the Assign_ONU-ID message with the ONU identifiers. In a ranging state, the ONU 103 synchronizes its upstream frame clock based on its assigned equalization delay. The ONU information including the OLT ID and the ONU serial number may be captured from the downstream signals 110 from the OLT 102 in the serial number state. ONU information may be captured from downstream signals transmitted from an OLT when communications standards other than the GPON communications standards are implemented in the PON. The ONU information may be captured from downstream signals for any communications standard that includes transmission of downstream messages that include the ONU information during an activation process.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

What is claimed is:

1. A test instrument connectable between a particular optical line terminal (OLT) and a particular optical network unit (ONU) of a passive optical network (PON) operating on an optical distribution network (ODN), the test instrument comprising:

a display;

an optical port to couple the test instrument to a test point on an optical connection in the ODN between the particular OLT and the particular ONU;

an optical receiver including a power meter to measure a power level of a downstream optical signal received via the optical port, wherein the downstream optical signal is transmitted from the OLT to the ONU;

a capture circuit coupled to the optical receiver, wherein the capture circuit is to capture ONU information from the downstream optical signal, the ONU information including an OLT identifier of the particular OLT and a serial number of the particular ONU; and a processor executing an ONU assignment determination test, the processor to:

display assignment-determination instructions on the display to cause an activation process between the particular ONU and the particular OLT to be invoked, wherein invoking the activation process causes the particular ONU to transmit the serial number of the particular ONU to the particular OLT, and, in response, the particular OLT is to transmit the downstream optical signal that contains the ONU information including the serial number of the particular ONU and the OLT identifier of the particular OLT;

determine whether a combination of the serial number of the particular ONU and the OLT identifier of the particular OLT captured by the capture circuit matches a known assignment of the particular ONU to the particular OLT; and in response to a determination that the combination of the serial number of the particular ONU and the OLT identifier of the particular OLT captured by the capture circuit matches the known assignment of the particular ONU to the particular OLT, display, on the display, an indication that the known assignment of the particular ONU to the particular OLT is found, to indicate that the test instrument is correctly coupled to the optical connection between the particular ONU and the particular OLT.

2. The test instrument of claim 1, wherein the test instrument is a termination mode device in that the downstream optical signal transmitted from the particular OLT to the particular ONU is received via the optical port of the test instrument and is terminated at the test instrument instead of being passed through the test instrument to the particular ONU.

3. The test instrument of claim 1, wherein a plurality of different types of PONs simultaneously operate on the ODN, and the processor determines a PON type of the PON that contains the particular ONU based on the ONU information captured by the capture circuit.

4. The test instrument of claim 1, wherein the ONU information captured by the capture circuit further comprises an ONU status of the particular ONU including activated or deactivated.

5. The test instrument of claim 1, wherein the power meter measures at least one of average optical power level and peak optical power level of the downstream optical signal.

6. The test instrument of claim 1, wherein the test point comprises an open port of a splitter in a last mile to the particular ONU.

7. The test instrument of claim 1, wherein the test point comprises a test access point between a splitter in a last mile to the particular ONU and the particular ONU.

8. The test instrument of claim 1, wherein the test point comprises a test access point upstream of a splitter in a last mile to the particular ONU.

9. The test instrument of claim 1, wherein the optical port of the test instrument is coupled to the test point via a coupler.

10. The test instrument of claim 1, wherein the processor compares the serial number of the particular ONU captured from the downstream optical signal to a known serial number of the particular ONU in the PON, and generates an indication on the display of whether the serial number of the particular ONU captured from the downstream optical signal matches the known serial number of the particular ONU.

11. A test instrument connectable to an optical distribution network (ODN) having a plurality of different types of passive optical networks (PONs) simultaneously operating on the ODN, the test instrument comprising:

a display;

an optical port coupling the test instrument to a test point on an optical connection in the ODN between a particular optical line terminal (OLT) and a particular optical network unit (ONU);

an optical receiver to receive a downstream signal via the optical port, wherein the downstream signal is transmitted from the particular OLT to the particular ONU;

a capture circuit coupled to the optical receiver, wherein the capture circuit is to capture ONU information from the downstream signal, the ONU information including an OLT identifier of the particular OLT and a serial number of the particular ONU; and a processor to:

display instructions on the display to cause an activation process between the particular ONU and the particular OLT to be invoked, wherein invoking the activation process causes the particular ONU to transmit the serial number of the particular ONU to the particular OLT, and, in response, the particular OLT is to transmit to the particular ONU the downstream signal that contains the ONU information including the OLT identifier of the particular OLT and the serial number of the particular ONU;

determine whether a combination of the serial number of the particular ONU and the OLT identifier of the particular OLT captured by the capture circuit matches a known assignment of the particular ONU to the particular OLT; and in response to a determination that the combination of the serial number of the particular ONU and the OLT identifier of the particular OLT captured by the capture circuit matches the known assignment of the particular ONU to the particular OLT, display, on the display, an indication that the known assignment of the particular ONU to the particular OLT is found, to indicate that the test instrument is correctly coupled to the optical connection between the particular ONU and the particular OLT, wherein the test instrument is a termination mode device, and the downstream signal received via the optical port is terminated at the test instrument instead of being passed through the test instrument to the particular ONU.

12. The test instrument of claim 11, wherein the activation process is invoked by disconnecting and reconnecting the particular ONU from the particular PON.

13. The test instrument of claim 11, wherein the ONU information captured by the capture circuit further comprises an ONU status of the particular ONU including activated or deactivated.

14. The test instrument of claim 11, further comprising:

a power meter measuring at least one of average optical power level and peak optical power level of the downstream signal.

15. The test instrument of claim 11, wherein the test point comprises an open port of a splitter in a last mile to the particular ONU.

16. The test instrument of claim 11, wherein the test point comprises a test access point between a splitter in a last mile to the particular ONU and the particular ONU.

17. The test instrument of claim 11, wherein the test point comprises a test access point upstream of a splitter in a last mile to the particular ONU.

18. The test instrument of claim 11, wherein the processor compares the serial number of the particular ONU captured from the downstream signal by the capture circuit to a known serial number of the particular ONU, and generates an indication on the display of whether the serial number of the particular ONU captured from the downstream signal matches the known serial number of the particular ONU.

19. A method of operating a test instrument to determine a one-to-one assignment of a particular optical network unit (ONU) to a particular optical line terminal (OLT) in a passive optical network (PON) operating on an optical distribution network (ODN), the method comprising:

displaying assignment-determination instructions on a display of the test instrument that has an optical port coupled to a test point on an optical connection between the particular ONU and the particular OLT, wherein the assignment-determination instructions cause an activation process between the particular ONU and the particular OLT to be invoked, and wherein invoking the activation process causes the particular ONU to transmit a serial number of the particular ONU to the particular OLT, and, in response, the particular OLT is to transmit to the particular ONU a downstream optical signal that includes the serial number of the particular ONU and an OLT identifier of the particular OLT;

receiving, via the optical port of the test instrument connected to the test point, the downstream optical signal transmitted from the particular OLT to the particular ONU, wherein the downstream optical signal received via the optical port of the test instrument is terminated at the test instrument instead of being passed through the test instrument to the particular ONU;

capturing, by a capture circuit of the test instrument, the serial number of the particular ONU and the OLT identifier of the particular OLT from the downstream optical signal;

determining, by a processor of the test instrument, whether a combination of the serial number of the particular ONU and the OLT identifier of the particular OLT captured from the downstream optical signal matches a known one-to-one assignment of the particular ONU to the particular OLT; and in response to a determination that the combination of the serial number of the particular ONU and the OLT identifier of the particular OLT captured from the downstream optical signal matches the known one-to-one assignment of the particular ONU to the particular OLT, displaying, on the display of the test instrument, an indication that the known one-to-one assignment of the particular ONU to the particular OLT is found, to indicate that the test instrument is correctly coupled to the optical connection between the particular ONU and the particular OLT.

20. The method of claim 19, comprising:

comparing the serial number of the particular ONU captured from the downstream optical signal to a known serial number of the particular ONU in the PON; and generating an indication on the display of whether the serial number of the particular ONU captured from the downstream optical signal matches the known serial number of the particular ONU.

\* \* \* \* \*